United States Patent
Wang et al.

(10) Patent No.: US 7,746,626 B2
(45) Date of Patent: Jun. 29, 2010

(54) PORTABLE ELECTRONIC DEVICE HAVING AUXILIARY INPUT UNIT

(75) Inventors: Chih-Kuang Wang, Tao-Yuan (TW); Ching-Shih Chen, Tao-Yuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 135 days.

(21) Appl. No.: 12/256,476

(22) Filed: Oct. 23, 2008

(65) Prior Publication Data
US 2009/0168317 A1 Jul. 2, 2009

(30) Foreign Application Priority Data
Dec. 31, 2007 (TW) .............................. 96151642 A (51) Int. Cl.
*G06F 1/16* (2006.01)
(52) U.S. Cl. ............................. 361/679.16; 455/575.1; 348/373; 248/396; 312/257.1
(58) Field of Classification Search ............. 455/575.1, 455/566, 575.4; 348/373; 361/679.16, 679.09, 361/679.01, 679.02, 679.26, 679.27, 679.39; 248/354.3, 205.1, 349.1, 396, 188.5; 312/334.44, 312/273, 257.1; 310/228, 326
See application file for complete search history.

(56) References Cited

U.S. PATENT DOCUMENTS

| | | | | |
|---|---|---|---|---|
| 2005/0253959 | A1* | 11/2005 | Nakamura | 348/373 |
| 2007/0123309 | A1* | 5/2007 | Sano et al. | 455/566 |
| 2009/0270139 | A1* | 10/2009 | Okajima et al. | 455/575.1 |

* cited by examiner

*Primary Examiner*—Hung V Duong
(74) *Attorney, Agent, or Firm*—Winston Hsu (57) ABSTRACT

A moving element having secondary keyboard for a portable electronic device is placed between a first member and a second member of the device for providing different keyboard sets to improve readability of text when in different operating configurations. When the second member slides out laterally relative to the first member, the moving element remains stayed in the first member, not moving with the second member. When the second member slides out vertically relative to the first member, the moving element slides with the second member along the sliding groove on the first member, and the moving element is exposed on top of the second member to present a concise dialing keyboard. The secondary keyboard contacts corresponding buttons of a primary keyboard directly. Thus, there is no need to provide additional circuit module exclusively for the secondary keyboard such that the cost and volume can be reduced.

10 Claims, 9 Drawing Sheets

PORTABLE ELECTRONIC DEVICE HAVING AUXILIARY INPUT UNIT

BACKGROUND OF THE INVENTION

1. Field of the Invention

The application relates to a portable electronic device, and more particularly, to a portable electronic device having auxiliary input unit.

2. Description of the Prior Art

With the advancement of technology, digital goods have been miniaturized and well-integrated for daily convenience. Mobile computing and communication devices such as mobile phones, personal digital assistances (PDAs), or smart phones have gained many advantageous functions over highly integration for single device with multiple functions. In addition to the traditional numeral keypads for dialing telephone number, smart phones of next generation include message service, personal note, e-mail service, scheduling, and web browsing as extra functions, which incorporate input interfaces such as touch screen or additional QWERTY keypads for friendliness. For example, when the back cover of a smart phone slides out vertically, the exposed numeral keypads allow a user to dial a phone number as if he/she is using a common mobile phone. When the back cover slides out laterally (or the display disposed on a front cover further tilting to a specific angle relative to the horizontal plane), the exposed keypads turn out to be an easy-to-input-text QWERTY keypads.

Figure 1:
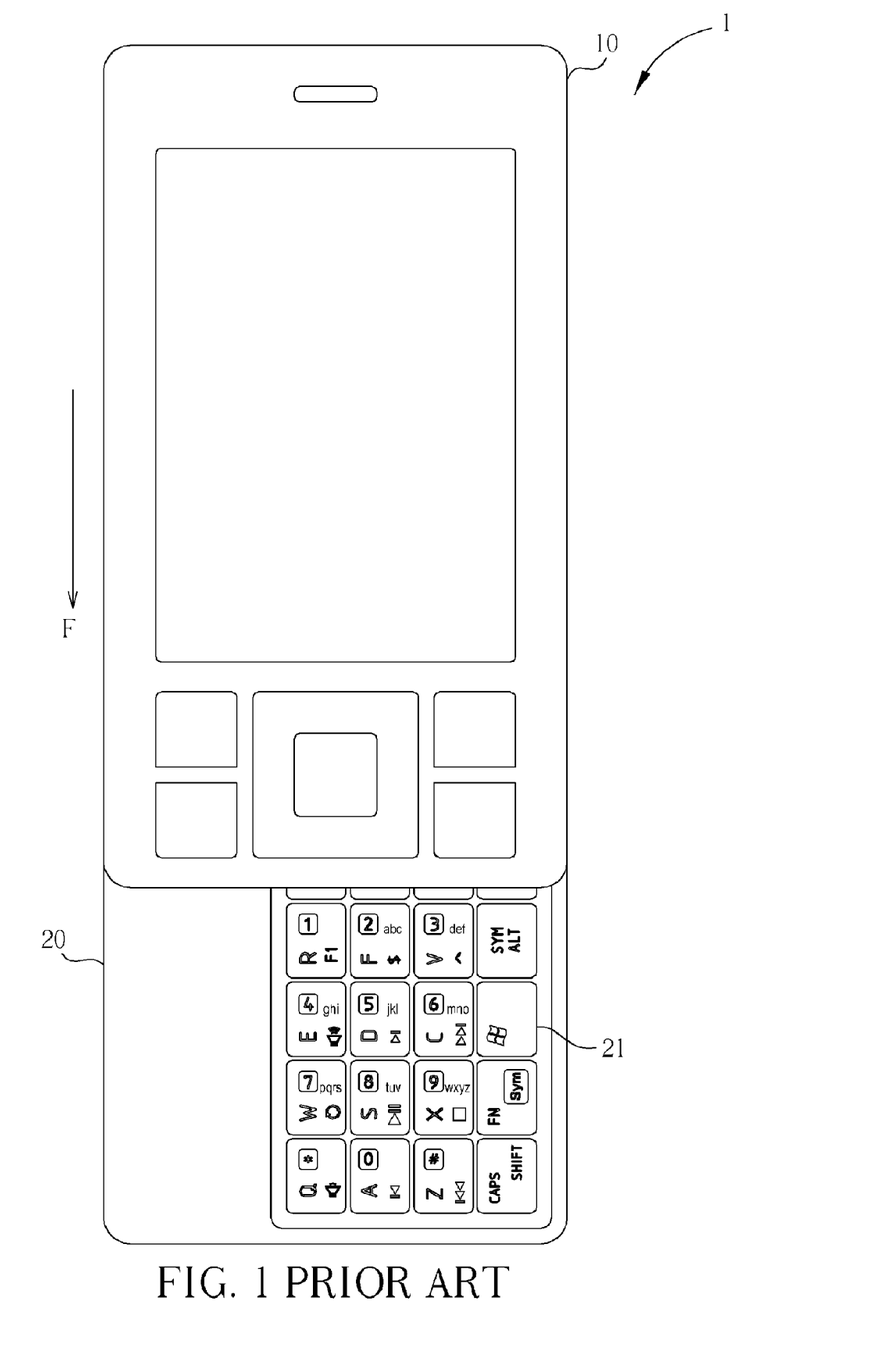
FIG. 1 is an illustration of a sliding phone according to the prior art with its back cover sliding out vertically to a specific position.
Figure 2:
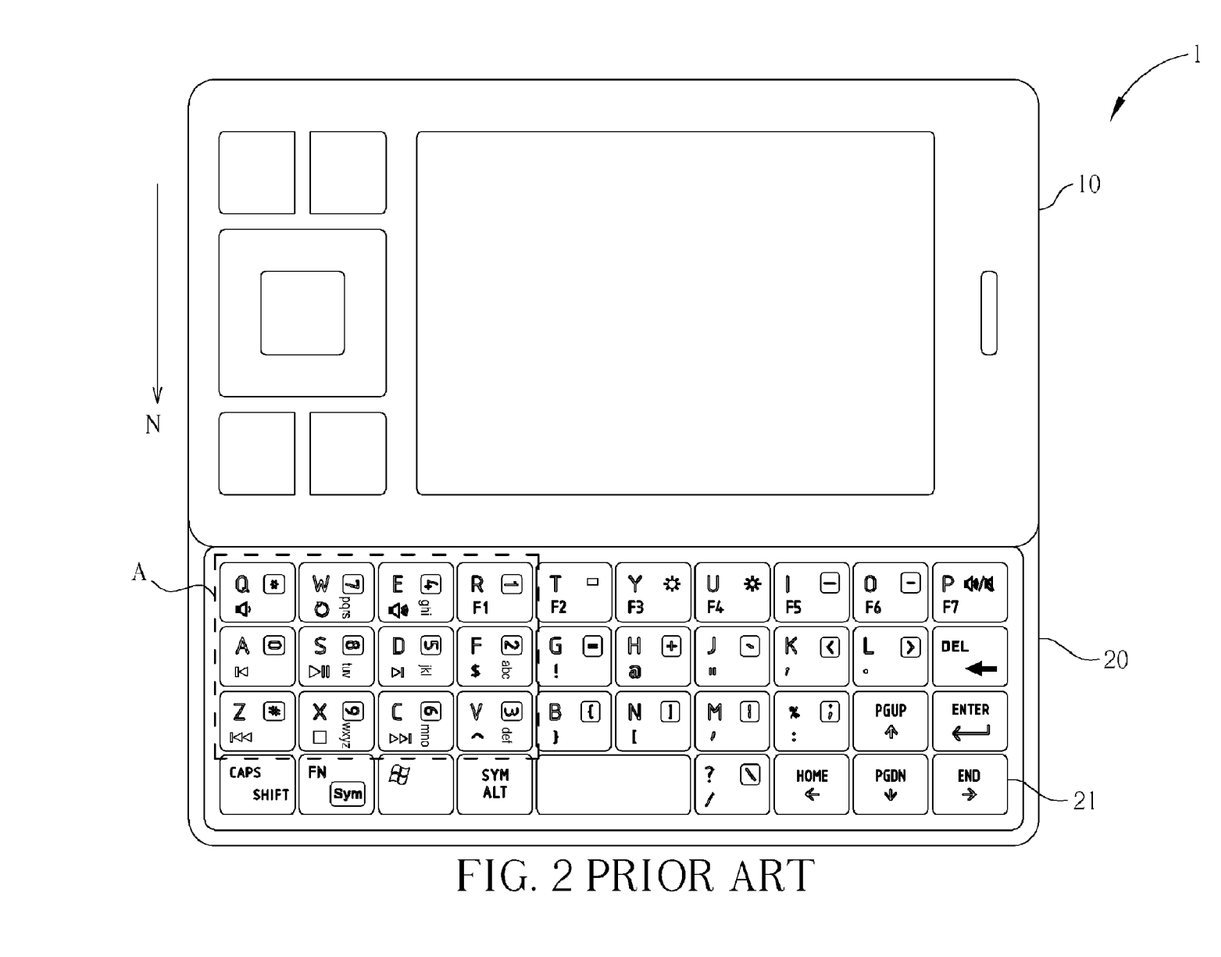
FIG. 2 is an illustration of the sliding phone according to the prior art with its back cover sliding out laterally to a specific position.

Please refer to FIG. 1 and FIG. 2. FIG. 1 is an illustration of a sliding phone 1 according to the previous products with its back cover sliding out vertically to a specific position. FIG. 2 is an illustration of the sliding phone 1 according to the previous products with its back cover sliding out laterally to a specific position. In FIG. 1, a second member 20 slides out along the direction F to the specific position relative to a first member 10 and a first set keyboard 21 disposed on the second member 20 exposes a set of vertical numeral buttons, which are a portion of the first keyboard 21, for dialing purpose. In FIG. 2, the second member 20 slides out along the direction N to the specific position relative to the first member 10 and the first set keyboard 21 is exposed completely. For the first keyboard 21, it has different functions in different configurations, meaning that a plurality of buttons in area An in FIG. 2 are used in both the vertical and the lateral configurations. For the sake of using the symbol/context disposed on the keyboard either in vertical or lateral configuration easily, two sets of text/numeral key on the buttons in area A of said first set keyboard 21 that are readable for the vertical configuration and the lateral configuration respectively are set and cause confusion to a user in either configuration. More specifically, with only one keyboard on the traditional sliding phone, many of the buttons on the single keyboard must contain as many kinds of symbols/text as possible for necessary functions. The only way to fill in all the symbols/text in such limited button area is to reduce the size of each symbol/text for proper arrangement, which inevitably causes messy and crowded presentation and brings to the user a lot inconvenience and confusion.

There are still other kinds of sliding phones in the market that have two separated keyboards, one for the numeral keypad in vertical configuration and the other for a QWERTY keyboard in lateral configuration. Such three-tier sliding phones have at least three members including a display (disposed on the top cover), a first set keyboard (a middle component including the numeral keypads), and a second set keyboard (the back cover including the QWERTY keyboard), each member having separated inner components and circuitry respectively. Although the problem in the prior paragraphs is solved in such three-tier sliding phones, the three-member structure in such sliding phones results in more complicated circuitry, higher cost, and even thicker product size.

SUMMARY OF THE INVENTION

The application provides a portable electronic device having an auxiliary input unit. The portable electronic device comprises a first member comprising a first sliding unit aligning along a first direction, a second member capable of sliding along the first direction and a second direction relative to the first member and comprising a second sliding unit, and a moving element configured between the first member and the second member and having a first side facing the first member and a second side facing the second member. The moving element further comprises a third sliding unit and a fourth sliding unit. The third sliding unit is configured on the first side allowing the moving element for sliding along the first direction relative to the first sliding unit and the fourth sliding unit is configured on the second side aligning along the second direction. The second sliding unit is capable of sliding along the second direction relative to the fourth sliding unit. When the second member slides along the first direction relative to the first member, the second sliding unit is utilized for driving the moving element to slide with the second member along the first direction relative to the first member.

These and other objectives of the application will no doubt become obvious to those of ordinary skill in the art after reading the following detailed description of the preferred embodiment that is illustrated in the various figures and drawings.

DETAILED DESCRIPTION

The application discloses that an extra moveable auxiliary input unit such as a secondary set keyboard is configured between a first member and a second member of a portable electronic device such that the portable electronic device can have different representations on different individual keyboards, for example, numeral symbols, alphabets, phonetic symbols, specific patterns, etc., in different configurations. Users can enjoy better readability from individual keyboard and stay away from confusion and inconvenience when using the portable electronic device.

Figure 3:
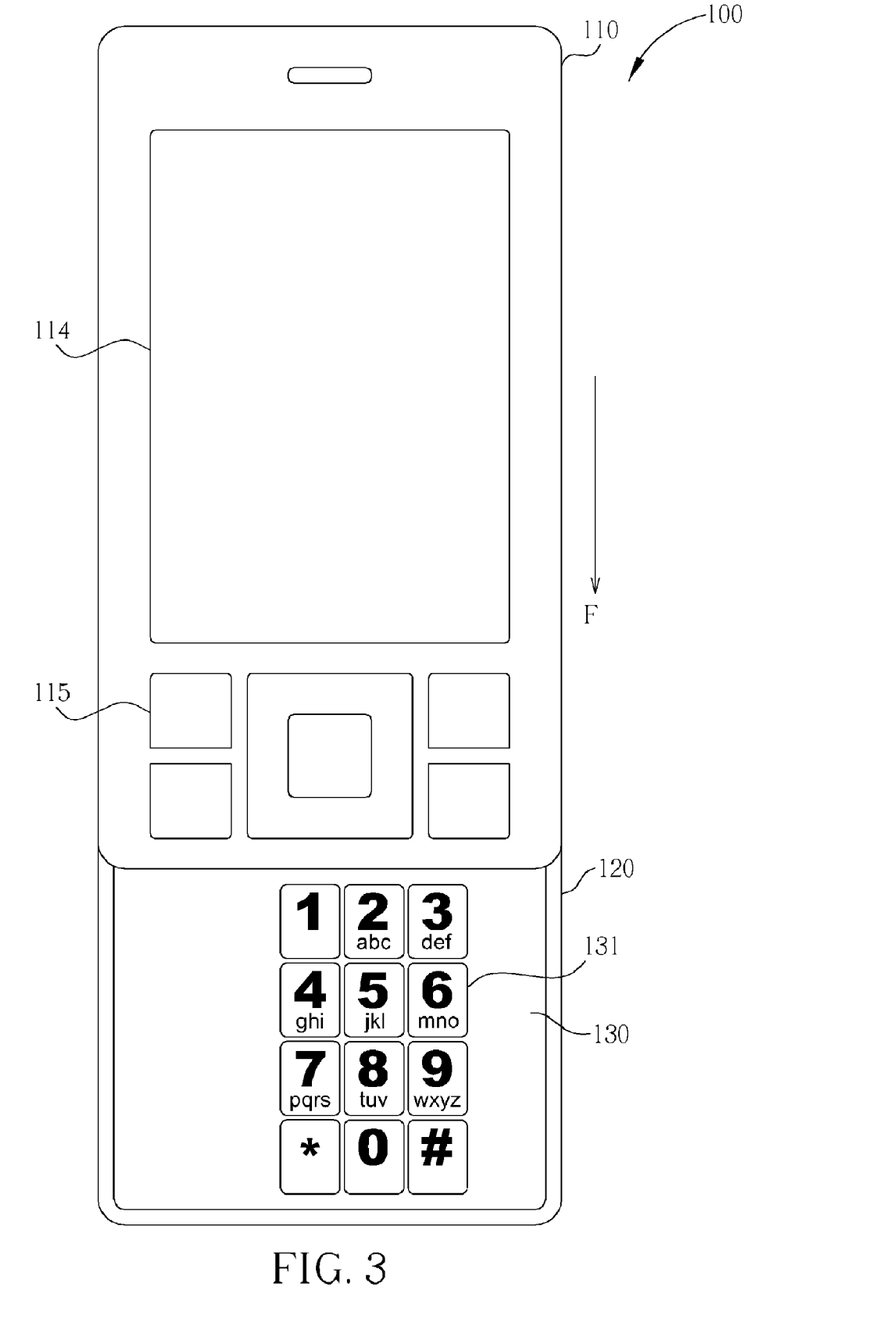
FIG. 3 is an illustration of a portable electronic device having an auxiliary input unit according to the application in vertical configuration.
Figure 4:
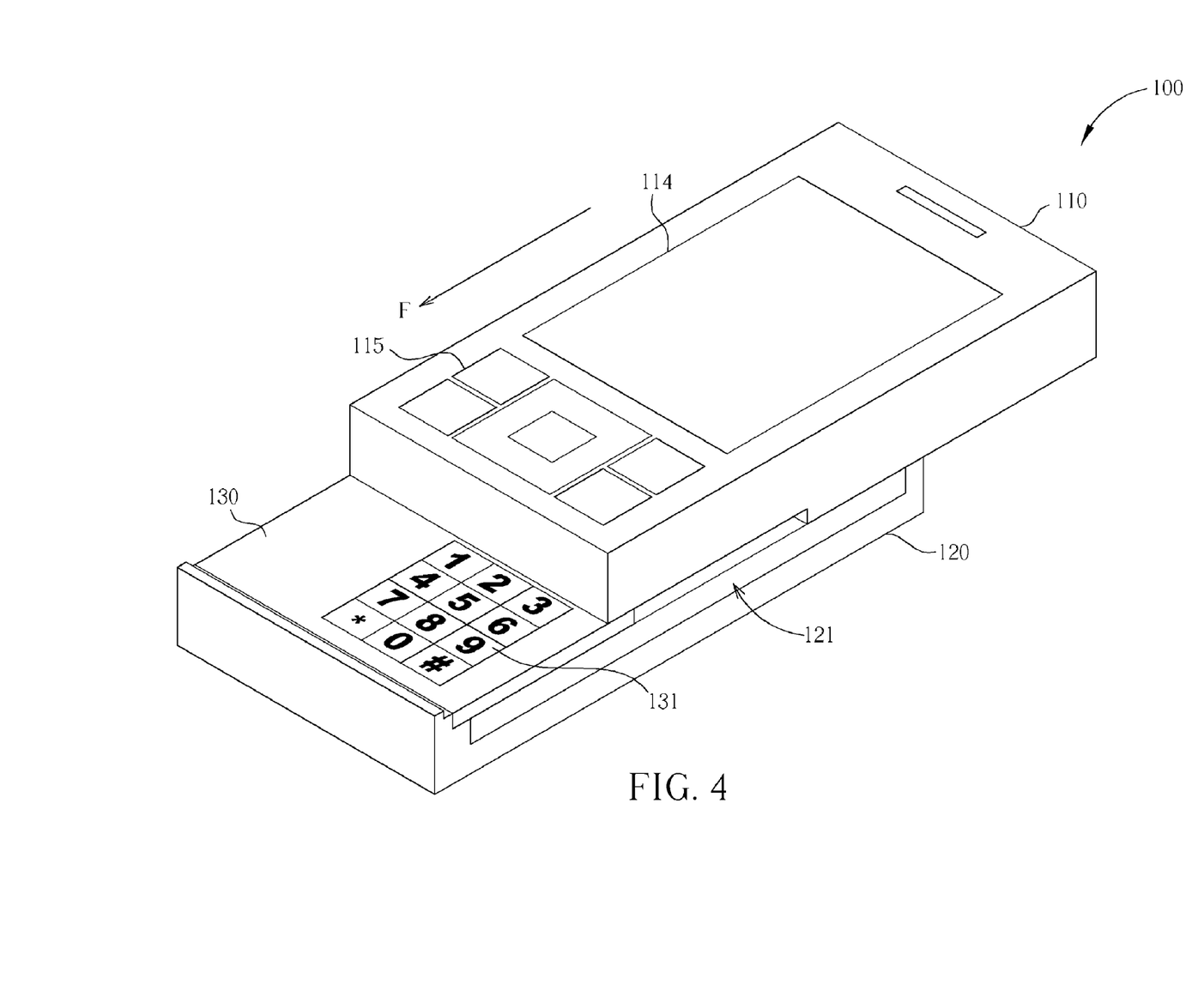
FIG. 4 is an illustration of the perspective view of the portable electronic device in FIG. 3.
Figure 5:
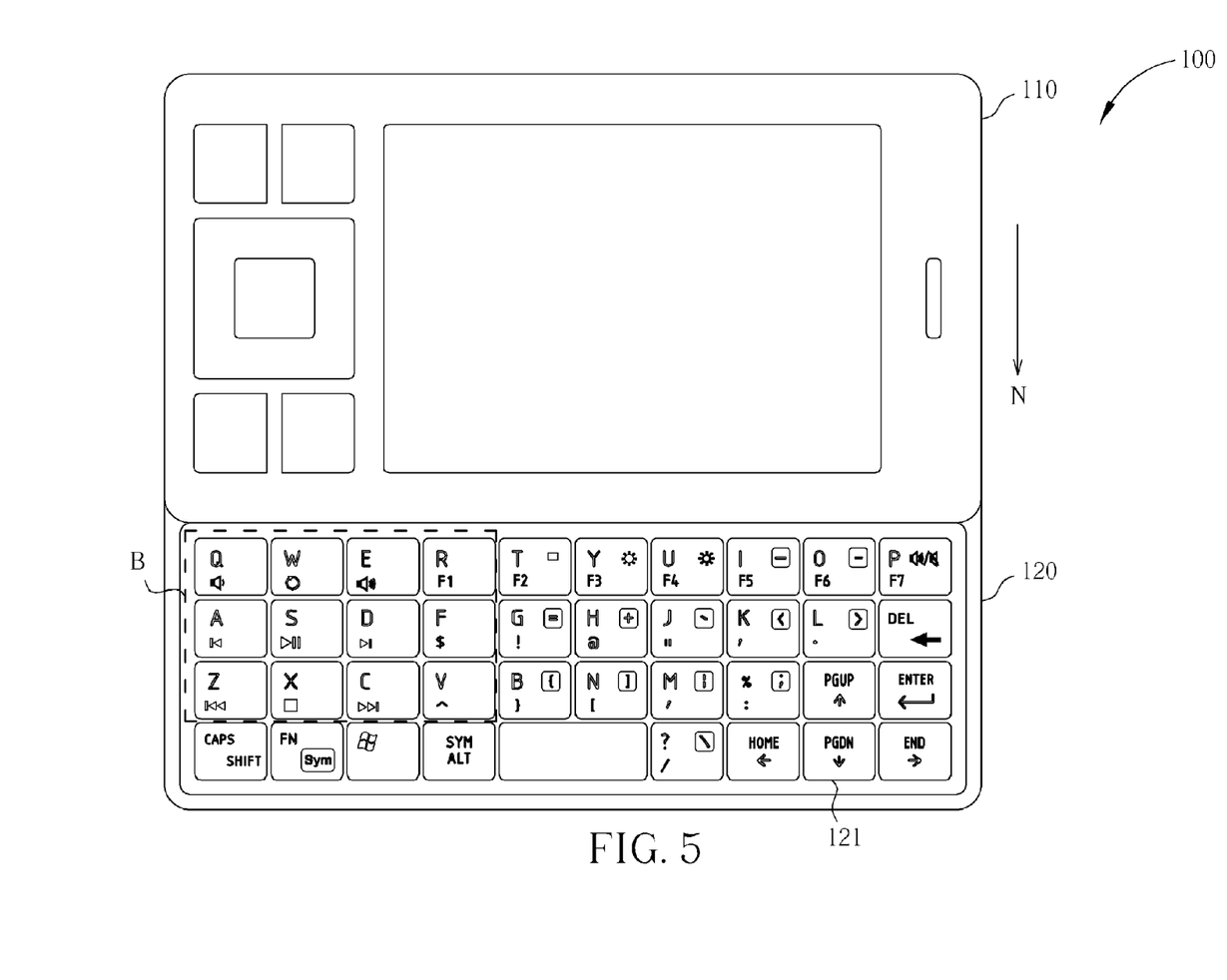
FIG. 5 is an illustration of the portable electronic device having an auxiliary input unit according to the application in lateral configuration.
Figure 9:
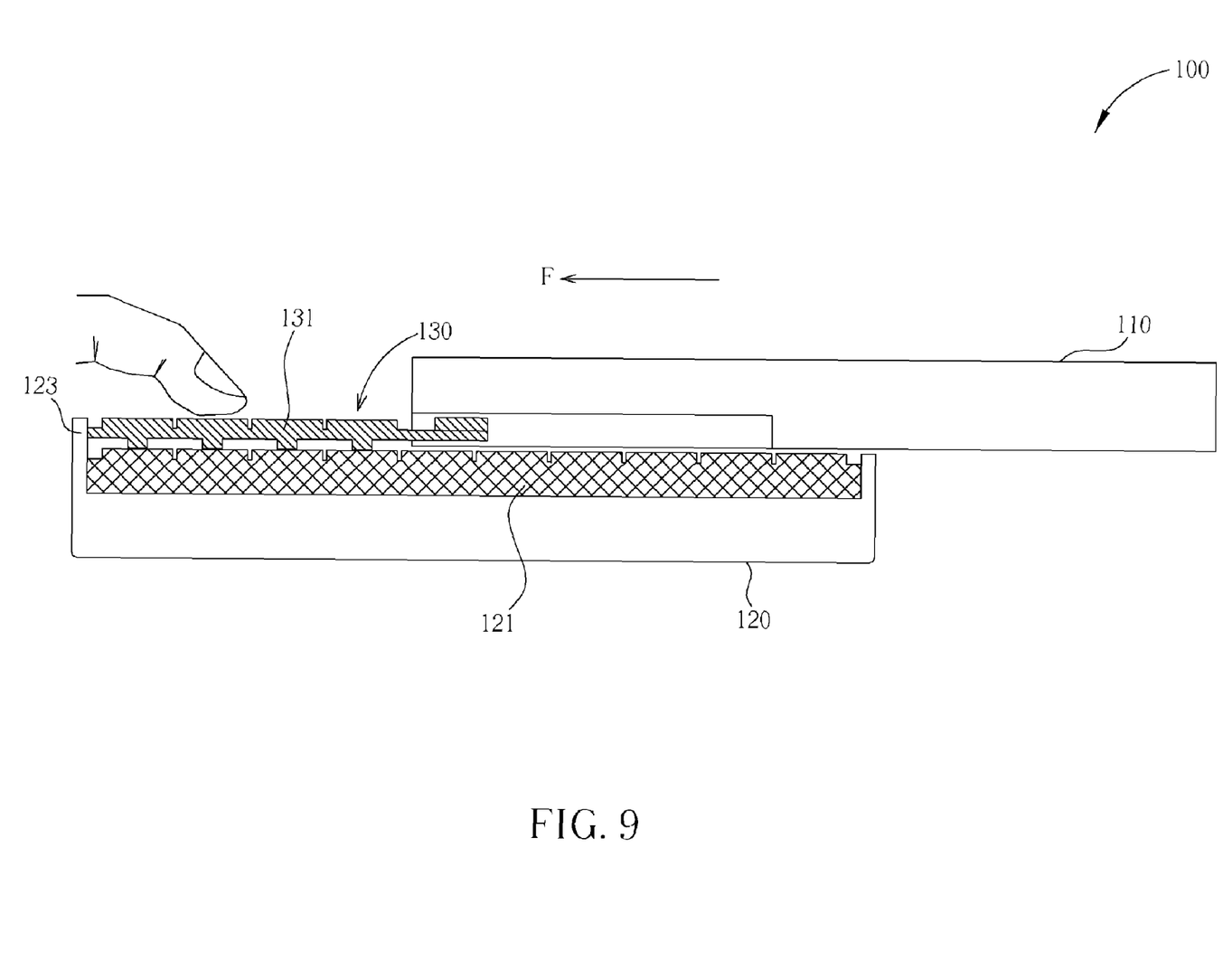
FIG. 9 is an illustration of the side view of the portable electronic device in vertical configuration.

Please refer to FIG. 3 and FIG. 4. FIG. 3 is an illustration of a portable electronic device 100 having an moving element 130 according to the application in vertical configuration and FIG. 4 is an illustration of the perspective view of the portable electronic device 100 in FIG. 3. The moving element 130 includes a secondary set keyboard 131. The portable electronic device 100 comprises a first member 110, a second member 120, and a moving element 130. Generally, the first member 110 can be a top cover of the portable electronic device 100 and has a display 114, which can be a touch screen, and an operation button 115. The second member 120 can be a back cover of the portable electronic device 100 and has a primary set keyboard 121 as shown in FIG. 4 and FIG. 5. In the embodiment, the primary set keyboard 121 is a keyboard with a QWERTY configuration or it can also be a keyboard with other key configuration designed for specific purpose. The moving element 130 is a foil and configured between the first member 110 and the second member 120 as shown in FIG. 4. There is a secondary set keyboard 131 on the moving element 130 and it can be a vertical numeral keypad in the embodiment. Besides, there is no extra individual electric modules, such as the circuit or the back light, are needed for the secondary set keyboard 131 on the moving element 130 in the embodiment. The secondary set keyboard 131 performs corresponding functions of each button by directly contacting and triggering buttons on the primary set keyboard 121 at corresponding position beneath, which can be shown in FIG. 9.

In FIG. 3 and FIG. 4, when the second member 120 slides out along the direction F relative to the first member 110, the moving element 130 moves with the second member 120 and slides out along the direction F relative to the first member 110. From a user's point of view, the user can directly view and operate the secondary set keyboard 131 with numeral buttons of concise symbols of the moving element 130; meanwhile the secondary set keyboard 131 can be considered as the aforementioned auxiliary input unit. Practically, each button of the secondary set keyboard 131 can directly contact a corresponding button on the primary set keyboard 121 below, as shown in area B in FIG. 5. In other words, the moving element 130, therefore, includes the auxiliary input unit and covers a portion of the primary set keyboard 121 for providing the auxiliary input unit with input function over the moving element 130 when contacting the primary set keyboard 121. Please also refer to FIG. 5. FIG. 5 is an illustration of the portable electronic device 100 in the lateral configuration. When the second member 120 laterally sliders out along the direction N relative to the first member 110 in order to use the QWERTY keyboard for complicated input, the moving element 130 does not slide out with the second member 20, which results to a complete presentation of the primary set keyboard 121 of the second member 120 as shown in FIG. 5. In this configuration, no numeral text used for buttons in the vertical configuration exists in the primary set keyboard 121 since only QWERTY-compatible configuration or configuration with other specific purpose is presented in the primary set keyboard 121. In order to perform the above sliding pattern of the first member and the second member, some sliding units, including components such as sliding groove, sliders, sliding shaft, or openings, are applied on the members and further detailed description is made as followed.

Figure 6:
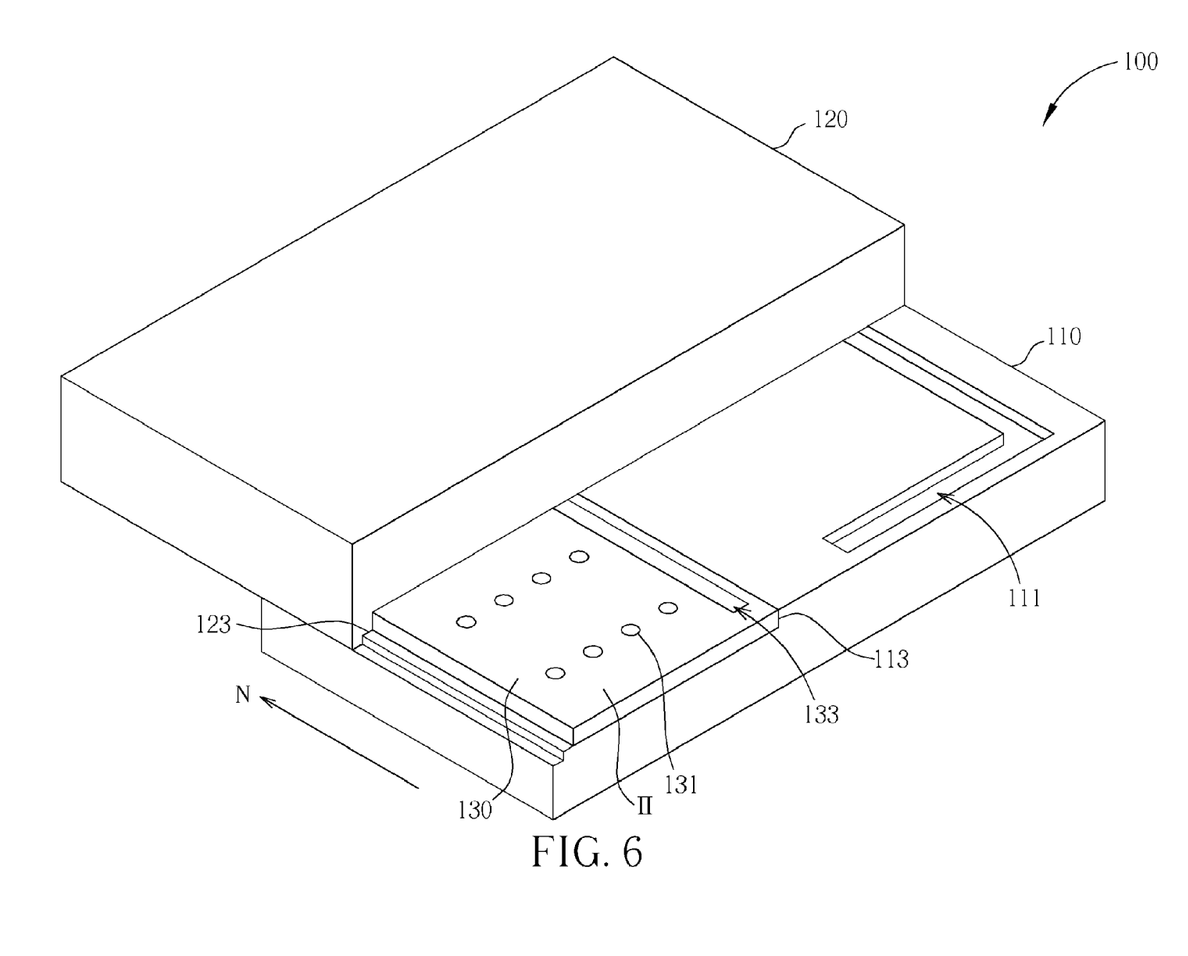
FIG. 6 is an illustration of the perspective back view of the portable electronic device in FIG. 5 with the second member sliding out along direction N relative to the first member.
Figure 7:
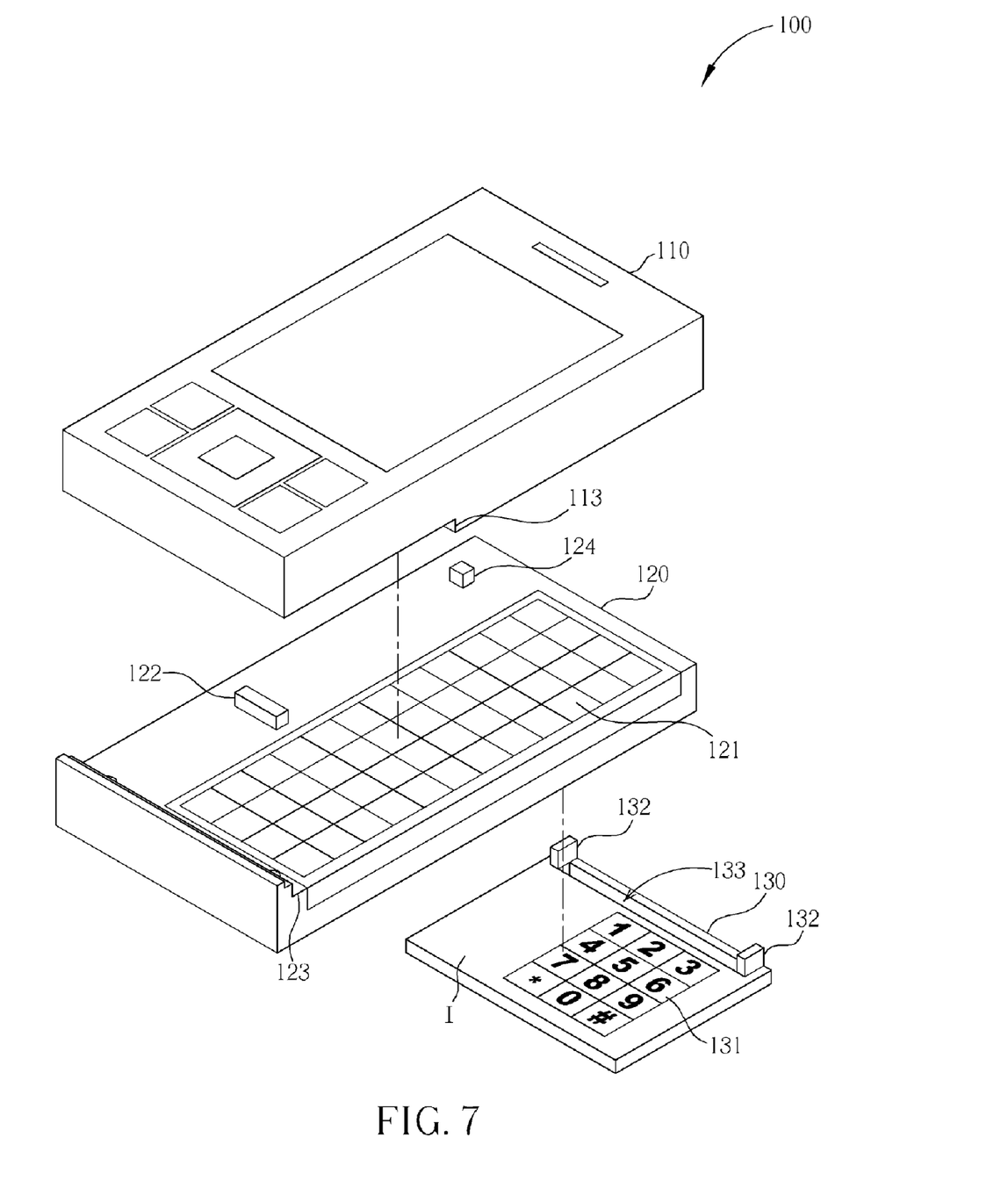
FIG. 7 is an illustration of the exploded view of the portable electronic device.
Figure 8:
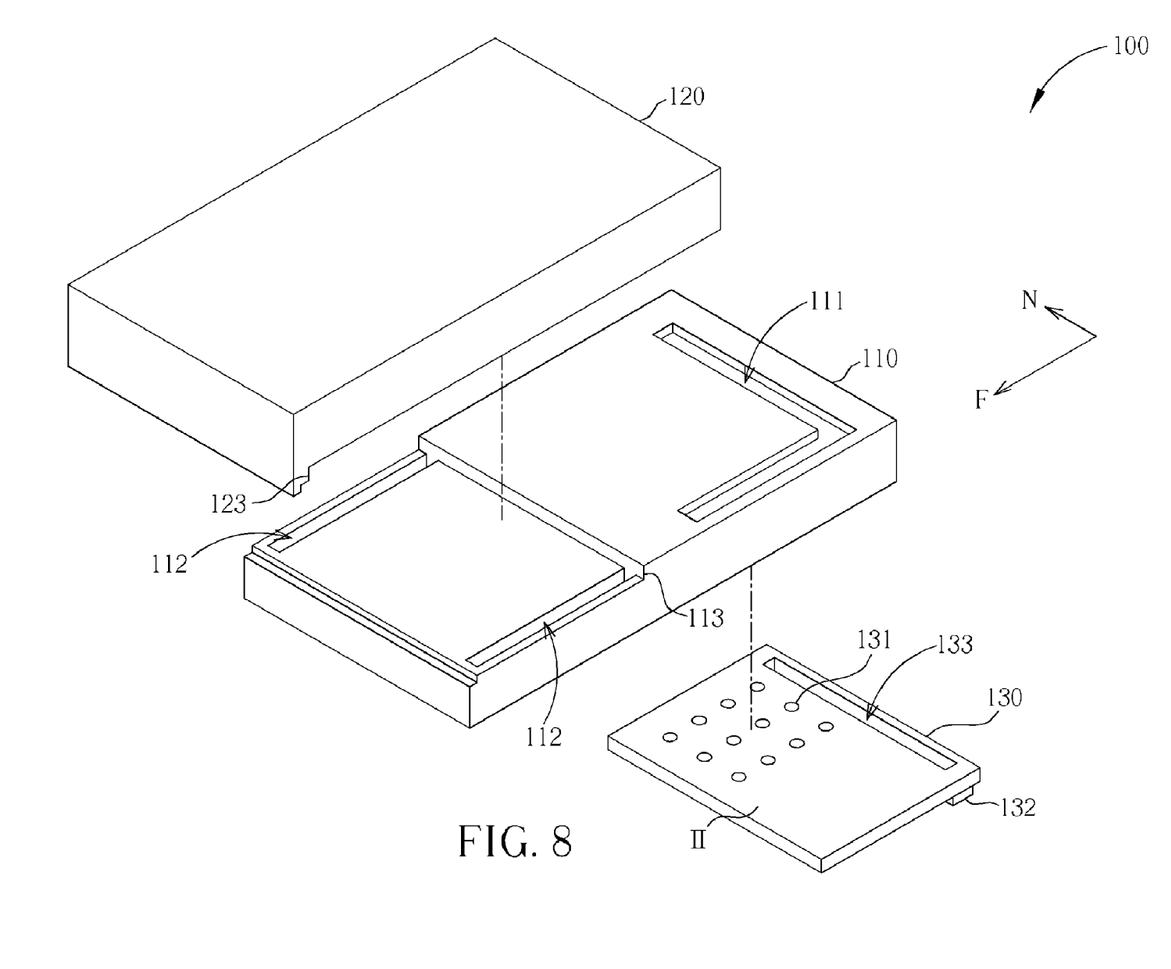
FIG. 8 is an illustration of another perspective view of the portable electronic device in FIG. 7.

Please refer to FIG. 6 to FIG. 8. FIG. 6 is an illustration of the perspective back view of the portable electronic device 100 in the lateral configuration and the second member 120 sliding out along the direction N relative to the first member 110. FIG. 7 is an illustration of the exploded view of the portable electronic device 100. FIG. 8 is an illustration of another perspective view of the portable electronic device 100 in FIG. 7. These figures show that the first member 110 further has an L-shape groove 111 on the back side (the side facing the second member 120) and the second member 120 further has a shaft 124 on the top side (the side facing the first member 110). When the first member 110 engages with the second member 120, the shaft 124 can move within the L-shape groove 124, providing the second member 120 to move vertically or laterally relative to the first member 110, which means the portable electronic device 110 can have vertical operation configuration or lateral operation configuration. In FIG. 6, the second member 120 moves laterally relative to the first member 110.

In FIG. 8, the first member 110 further comprises one or more first sliding grooves 112, the amount of the first sliding grooves 112 corresponding to the amount of the second sliders 132 on the moving element 130. The first sliding groove 112 aligns along the direction F on the first member 110. In FIG. 7, the second member 120 further comprises a first slider 122. When in assembly, the first side labeled with I of the moving element 130 faces the first member 110 and comprises one or more second sliders 132 that the amount of the sliders 132 correspond to the first sliding groove 112 of the first member 110, and the second side labeled with II of the moving element 130 faces the second member 120 and comprises a second sliding groove 133 aligning along the direction N. When in assembly, the moving element 130 is configured between the first member 110 and the second member 120, the second slider 132 on the first side labeled I of the moving element 130 is within the first sliding groove 112 of the first member 110, and the first slider 122 of the second member 120 is within the second sliding groove 133 on the second side labeled II of the moving element 130. In the embodiment, the direction F means a vertical direction and the direction N means a lateral direction.

The direction F alignment of the first sliding groove 112 (FIG. 8) allows the second slider 132 to only move along the direction F in the first sliding groove 112. When the second member 120 slides out along the direction N relative to the first member 110 as shown in FIG. 6, the second slider 132 on the first side labeled with I of the moving element 130 are restricted by the first sliding groove 112 of the first member 110. Meanwhile, the direction N alignment of the second sliding groove 133 on the second side labeled with II of the moving element 130 (the second sliding groove 133 is a lengthy groove penetrating the moving element 130 in the embodiment) allows the first slider 122 on the second member 120 to move along the direction N in the second sliding groove 133 and therefore, the second slider 122 of the second member 120 is movable in the second sliding groove 133 along the N direction. Thus, the second member 120 can slide out the first member 110 along the direction N laterally but not drive the moving element 130 altogether. The moving element 130 can still stay at the first member 110 as FIG. 6 shows. In such configuration as shown in FIG. 5 or FIG. 6, the primary set keyboard 121 on the second member 120 can be completely exposed instead of being partly covered by the moving element 130 when the second member 120 slides along the direction N laterally relative to the first member 110. A stop unit 113 on the first member 110 and a stop unit 123 on the second member 120 can keep the moving element 130 detaching from the members along the direction F respectively. Since the second slider 132 of the moving element 130 is restricted by the first sliding groove 112 of the first member 110, the moving element 130 is not detached along the direction N. The stop units 113 and 123 can also keep the moving element 130 stay even between the first member 110 and the second member 120. On the other hand, the first slider 122 stays at the second sliding groove 133 for preventing the moving element 130 detaching from the portable electronic device 100 even though the moving element 130 might be detached from the portable electronic device 100 in some operating configurations without the existence of the stop unit 123.

When the second member 120 is desired to slide out along the direction F relative to the first member 110, the direction N alignment of the second sliding groove 133 on the second side labeled with II of the moving element 130 prevents the first slider 122 of the second member 120 from moving along the direction F relative to the second sliding groove 133. However, the second slider 132 on the first side labeled with I of the moving element 130 is allowed to move along the direction F in the first sliding groove 112 of the first member 110. As a result, the second member 120 will drive the moving element 130 along direction F together when sliding out vertically relative to the first member 110, the configuration of which is shown in FIG. 4. From the user's point of view, in such configuration, only the secondary set keyboard 131 on the moving element 130 is exposed and shows the concise symbol patterns on the buttons for the user easiness to operate the numeral buttons without causing reading or input confusion. Meanwhile, the stop unit 123 of the second member 120 keeps the moving element 130 stayed and prevents it detaching from the members along direction F. Since the third slider 132 of the moving element 130 is restricted by the first sliding groove 112 of the first member 110, the moving element 130 would not be detached along direction N.

Additionally, the embodiment mentioned above reveals that the second member 120 can have relative movement along the direction N with respect to the moving element 130 over using the first slider 122 sliding in the second sliding groove 133 of the second side labeled with II of the moving element 130. In other embodiments, however, the first slider 122 and the second sliding groove 133 can be replaced by rod-and-hole assembly for higher sliding stability between the second member 120 and the moving element 130. For example, the second member 120 is in harmony with a sliding rod of the moving element 130 over the first slider 122, wherein the first slider 122 here is a protruding piece with a circular hole, interacting with the sliding rod, which passes through the circular hole of the first slider 122. When the second member 120 moves relative to the moving element 130, the circular hole of the first slider 122 can slide across the sliding rod of the moving element 130 and higher sliding stability is guaranteed.

In the embodiments of the present invention, the portable electronic device 100 can be a mobile phone, a personal digital assistant (PDA), a global positioning system (GPS), an ultra mobile personal computer (UMPC), or a laptop computer but the scope of application of the present invention is not limited by the above-mentioned devices. Any electronic device that comprises at least two relatively movable covers/members and installs a secondary set keyboard necessarily, i.e., an auxiliary input unit, is enclosed in the scope of the present invention.

The application discloses that a moving element having a secondary set keyboard for a portable electronic device is placed between a first member and a second member of the portable electronic device. With the moving element, the portable electronic device is capable of providing different keyboard sets to improve readability of symbol/text when the portable electronic device is in different operating configurations. When the second member slides out laterally relative to the first member, the moving element remains stayed at the back of the first member and does not move out with the second member. When the second member slides out vertically relative to the first member, the slider of the moving element is capable of sliding together with the second member along the sliding groove on the first member, and the moving element is exposed on top of the second member to present a concise dialing keyboard. Since the secondary keyboard covers and/or contacts corresponding numeral buttons of the primary keyboard directly in vertical configuration, there is no need to provide additional keyboard circuit or related module especially for the secondary set keyboard. Therefore, the cost and volume can be reduced without additionally increasing the thickness of the portable electronic device and resulting in more convenience under this design.

Those skilled in the art will readily observe that numerous modifications and alterations of the device and method may be made while retaining the teachings of the application.

What is claimed is:

1. A portable electronic device having an auxiliary input unit, comprising:
    a first member comprising a first sliding unit aligning along a first direction;
    a second member capable of sliding along the first direction and a second direction relative to the first member and comprising a second sliding unit; and
    a moving element configured between the first member and the second member and having a first side facing the first member and a second side facing the second member, the moving element further comprising a third sliding unit and a fourth sliding unit, the third sliding unit configured on the first side allowing the moving element for sliding along the first direction relative to the first sliding unit, the fourth sliding unit configured on the second side aligning along the second direction, the second sliding unit capable of sliding along the second direction relative to the fourth sliding unit;
    wherein when the second member slides along the first direction relative to the first member, the second sliding unit is utilized for driving the moving element to slide with the second member along the first direction relative to the first member.

2. The portable electronic device of claim 1, wherein the second member further comprises a stop unit for preventing the moving element detaching from the second member.

3. The portable electronic device of claim 1, wherein the second member further comprises a primary set keyboard and the moving element further comprises the auxiliary input unit, the moving element being utilized for covering a portion of the primary set keyboard for providing the auxiliary input unit with input function over the moving element contacting the primary set keyboard.

4. The portable electronic device of claim 3, wherein the auxiliary input unit is a secondary set keyboard.

5. The portable electronic device of claim 1, wherein when the second member slides along the second direction relative to the first member, the third sliding unit configured on the moving element is restricted by the first sliding unit for restricting the moving element sliding with the second member along the second direction relative to the first member, and the second member is allowed to slide along the second direction relative to the first member over the second sliding unit in harmony with the fourth sliding unit.

6. The portable electronic device of claim 1, wherein the first direction is a vertical direction and the second direction is a lateral direction.

7. The portable electronic device of claim 1, wherein the first sliding unit and the fourth sliding unit are sliding groove, and the second sliding unit and the third sliding unit are slider.

8. The portable electronic device of claim 1, wherein the first member further comprises an L-shape groove and the second member further comprises a shaft movably within the L-shape groove.

9. The portable electronic device of claim 1, further comprising a display and an operation button.

10. The portable electronic device of claim 1, wherein the portable electronic device comprises a mobile phone, a personal digital assistant (PDA), a global positioning system (GPS), an ultra mobile personal computer (UMPC), or a laptop computer.

* * * * *